(12) United States Patent
Hsu

(10) Patent No.: US 6,977,479 B2
(45) Date of Patent: Dec. 20, 2005

(54) PORTABLE CELL PHONE BATTERY CHARGER USING SOLAR ENERGY AS THE PRIMARY SOURCE OF POWER

(76) Inventor: Po-Jung (John) Hsu, 38841 Tyson La., Fremont, CA (US) 94536

( * ) Notice: Subject to any disclaimer, the term of this patent is extended or adjusted under 35 U.S.C. 154(b) by 0 days.

(21) Appl. No.: 10/313,698

(22) Filed: Dec. 5, 2002

(65) Prior Publication Data

US 2003/0128010 A1 Jul. 10, 2003

Related U.S. Application Data

(60) Provisional application No. 60/347,232, filed on Jan. 8, 2002.

(51) Int. Cl.[7] ............................. H01M 10/44; H02J 7/00
(52) U.S. Cl. ....................................... 320/101; 320/114
(58) Field of Search ............................... 320/101, 114, 320/110, 112, 115, 128; 455/575.3, 572, 573, 95; 379/433.08

(56) References Cited

U.S. PATENT DOCUMENTS

| | | | | |
|---|---|---|---|---|
| 5,506,490 A | * | 4/1996 | DeMuro | 320/106 |
| 5,733,674 A | * | 3/1998 | Law et al. | 320/125 |
| 5,814,906 A | * | 9/1998 | Spencer et al. | 307/150 |
| 5,855,692 A | * | 1/1999 | Kaji et al. | 136/245 |
| 5,920,178 A | * | 7/1999 | Robertson, Jr. et al. | 320/114 |
| 6,006,103 A | * | 12/1999 | Van Lerberghe | 455/550 |
| 6,094,540 A | * | 7/2000 | Kikuchi | 396/304 |
| 6,096,969 A | * | 8/2000 | Fujita et al. | 136/259 |
| 6,275,741 B1 | * | 8/2001 | Choi | 700/200 |
| 6,339,311 B1 | * | 1/2002 | Caldwell | 320/101 |
| 6,346,791 B1 | * | 2/2002 | Barguirdjian | 320/101 |
| 6,504,340 B1 | * | 1/2003 | Lee | 320/101 |
| 6,531,845 B2 | * | 3/2003 | Kerai et al. | 320/107 |
| 6,647,249 B1 | * | 11/2003 | Crisp | 455/90 |
| 6,737,573 B2 | * | 5/2004 | Yeh | 136/245 |

FOREIGN PATENT DOCUMENTS

| | | | |
|---|---|---|---|
| JP | 10126477 | * | 10/1996 |
| JP | 11187581 | * | 12/1997 |
| JP | 10137025 | * | 5/1998 |
| JP | 10146213 | * | 6/1998 |
| JP | 10256933 | * | 9/1998 |
| JP | 10270729 | * | 10/1998 |
| JP | 411103336 | * | 4/1999 |
| JP | 2001268198 | * | 3/2000 |
| JP | 2001292214 | * | 4/2000 |
| JP | 2000175720 | * | 6/2000 |

OTHER PUBLICATIONS

Solar Web, Inc./SunWize Energy Systems, "The Power to make your design a reality", 1991.*

* cited by examiner

Primary Examiner—Pia Tibbits
(74) Attorney, Agent, or Firm—Burns, Doane, Swecker & Mathis, L.L.P.

(57) ABSTRACT

A portable, cellular phone battery charger using solar energy as the primary source of power and including two separate solar panels and a battery/switch containing unit. The two panels are hingedly connected together, and the battery/switch containing unit is hingedly connected to the back side of one of the panels. The assembly is pivotable between a retracted configuration in which the three component parts lie in parallel planes, and a deployed configuration in which the two solar panels lie in one plane and the battery/switch unit lies in another plane angularly intersecting the solar panel plane. The device is selectively operable in three different modes; namely, a first mode in which the solar panels are connected to charge or power a cell phone; a second node in which the solar panels are connected to charge the device's internal battery, and a third mode in which the internal battery is used to charge or power a phone coupled to the device.

11 Claims, 5 Drawing Sheets

PORTABLE CELL PHONE BATTERY CHARGER USING SOLAR ENERGY AS THE PRIMARY SOURCE OF POWER

CROSS-REFERENCE TO RELATED APPLICATIONS

This patent application claims the benefit of the filing date of U.S. Provisional Patent Application Ser. No. 60/347,232, filed Jan. 8, 2002 and entitled "CELLULAR TELEPHONE BATTERY CHARGER", the entire contents of which is hereby expressly incorporated by reference.

FIELD OF THE INVENTION

The present invention relates generally to solar energy powered battery charging devices and more particular to a compact, portable cellular telephone battery charger using solar energy as the primary source of power.

BACKGROUND OF THE INVENTION

Most cellular phones are equipped with rechargeable batteries which can be recharged through a power conversion adapter used in conjunction with household alternating current (AC) power or through a power conversion adapter used in conjunction with a 12-volt cigarette lighter socket provided in an automobile. However, depending on the frequency or duration of use of the cellular phone, leaving the phone in the "ON" mode or engaging in air time talking to another person, the battery may only last for a few hours.

It would be desirable to have a portable battery charging device that is capable of using solar power to charge batteries in a cellular phone.

It would also be desirable to have a battery charging device that is alternatively capable of charging the battery in a cellular phone using the power of regular non-rechargeable batteries.

It would further be desirable to have a cellular phone battery charging device that uses solar power to charge one or more self contained rechargeable batteries for use as backup batteries and that permits use of such backup batteries to charge the battery in the cellular phone or to power the cellular phone directly.

SUMMARY OF THE INVENTION

It is therefore an object of the present invention to provide a convenient portable device for charging cellular phone batteries so that the phone is always available for communications usage.

It is another object of the present invention to provide a cellular phone battery-charging device that utilizes solar power as its energy source.

It is yet another object of the invention to provide a device to charge cellular phone batteries from a set of rechargeable batteries not originally included with the cellular phone.

Briefly, a presently preferred embodiment of the present invention is an assembly comprised of three basic component parts including two separate solar panels and a battery and switch containing unit disposed in a separate housing. The two solar panels are hingedly connected together, and the internal battery and switch containing housing is hingedly connected to the back side of one of the panels. The solar panels are rotatable relative to each other. The assembly is pivotable between a contracted or retracted configuration in which the three component parts lie in parallel planes, and a deployed configuration in which the two solar panels lie in one plane and the battery/switch unit lies in another plane angularly intersecting the deployed, solar panel plane. The device is selectively operable in three different modes; namely, a first mode in which the solar panels are connected to directly charge or power a phone coupled to the device, a second mode in which the solar panels are connected to directly charge only the internal rechargeable battery, and a third mode in which only the internal battery is used to directly charge or power a phone coupled to the device.

An important advantage of the present invention is that it provides a portable means for charging the battery of a cellular phone or other battery powered device without requiring connection to residential or commercial power source.

Another advantage of the present invention is that it provides a device of the type described that can be used to charge or power a phone with or without ambient sunlight.

Still another advantage of the present invention is that it provides a device of the type described that in the presence of sunlight can recharge its own internal batteries.

These and other object sand advantages of the present invention will no doubt become apparent to those skilled in the art after having read the following detailed description of the embodiment illustrated in the several figure of the drawing.

DETAILED DESCRIPTION OF THE PREFERRED EMBODIMENT

Figure 1:
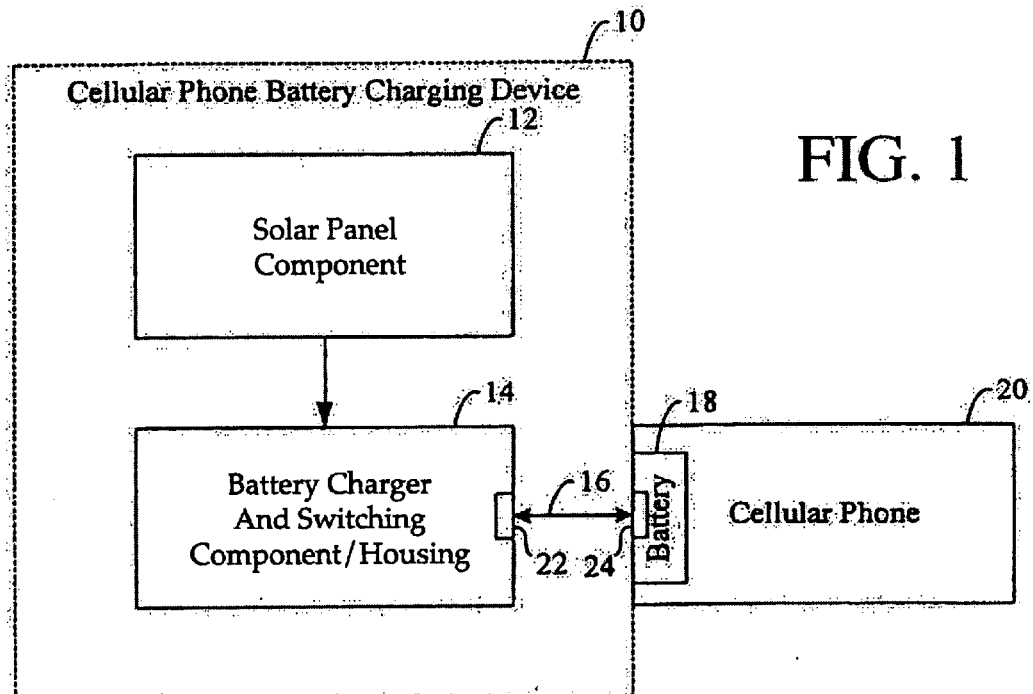
FIG. 1 is a generalized block diagram schematically illustrating the principal components of an exemplary cellular phone battery charging device in accordance with the present invention.

Referring now to the drawing, FIG. 1 is a block diagram schematically illustrating an exemplary cellular phone battery charging device in accordance with the present invention. The device 10 includes a solar energy collecting component 12 including two solar enemy collecting panels, a battery charger and switching component disposed in a separate housing 14, and an adapter cable 16 for providing power to and/or charging the battery 18 in a cellular phone 20 connected thereto.

The battery charger and switching component within housing 14 is suitably electrically connected as suggested by the line 13 to the solar panel component 12 for receiving electrical power converted from solar energy by the solar panels. The technology of converting solar energy to electrical power is well known to those skilled in the art.

The adapter cable 16 has on one end a first plug (not shown) for connection to a receptacle 22 in the battery charger and switching component housing 14, and a second plug (not shown) on the other end for connection to a connector 25 on the cellular phone 20. The second plug of the adapter cable 16 can be of any of many interface configurations suitable for connection to cellular phones manufactured by different companies. For instance, it could be made to adapt to cellular phones manufactured by vendors, such as Qualcomm, Nokia, Motorola, Samsung, Toshiba, Ericsson, etc. The cellular phone user may select, from several provided configurations, the adapter cable suitable for his particular cellular phone interface. The adapter cable 16 is normally attached to the cellular phone 20 during the time of charging the cellular phone battery, but may be disconnected upon completion of the charging process. However, one may also talk on the cellular phone during the charging operation.

Figure 2:
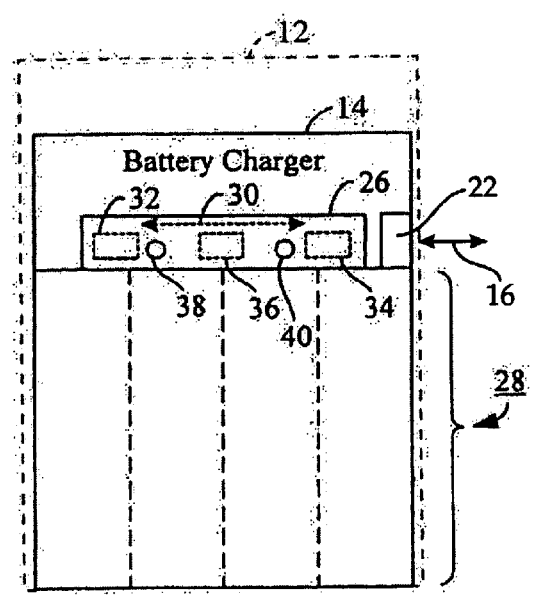
FIG. 2 is a generalized diagram schematically illustrating the battery charger of FIG. 1 and its various operational modes.

FIG. 2 is a block diagram schematically illustrating the component 14 and its three position mode selection switch 26 shown positioned in front of the solar panel component suggested by the dashed lines 12. As illustrated, the component 14 includes a compartment 28 adapted to receive four AA-sized batteries arranged so that they are connected in series. These batteries can be either non-rechargeable AA-sized batteries or may be rechargeable batteries of similar capacity. However, rechargeable type batteries must be used if they are to be recharged. Either non-rechargeable batteries or rechargeable batteries can be used to charge the battery 18 in the cellular phone 20.

The switch 26 is used to select the operational mode, that is, the source and destination of the charging current during a charging operation to be performed. In the illustrated embodiment, and as indicated by a dashed arrow 30, a sliding armature of the switch can be manually positioned to select one of three modal positions. Placing the switch armature in a fist position 32 connects the output of the solar panel component 12 directly to an output connector 16 (FIG. 1) via a jack 22 so that the converted solar power energy can be used to charge the cellular phone battery. Placing the switch armature in a second position 34 directs the power from the batteries in the component 14 to the output connector connected to the cellular phone, either to be directly consumed by the cellular phone or to be used to charge the battery in the cellular phone. Positioning the switch armature in a third position 36 connects the output of the solar panels directly to the internal batteries installed in the component 14 to charge them.

The component 14 further includes a pair of light emitting diodes (LEDs) indicating the operational mode or charging operation selected by the switch armature position. A first LED 38 relates to the first armature position 32, and is turned on when it is placed in this position to charge the cellular phone directly using the converted solar power. A second LED 40 relates to the second armature position 34, and is additionally turned on when the storage batteries installed in the component 12 are used to charge the cellular phone. Neither of the LEDs is lit when the armature isin the internal battery charging position 36.

Figure 3A:
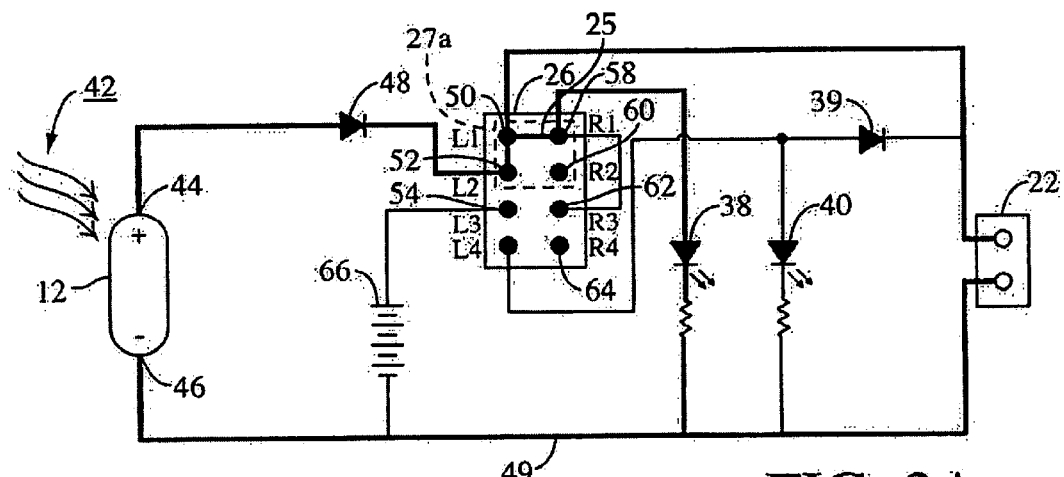
FIGS. 3A–3C are schematic diagrams depicting the three operational modes alluded to with respect to FIG. 2.
Figure 3B:
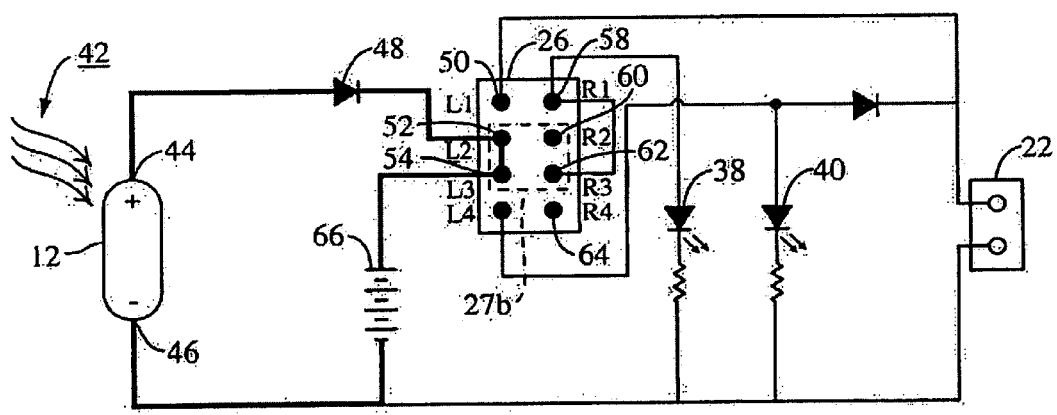
Figure 3C:
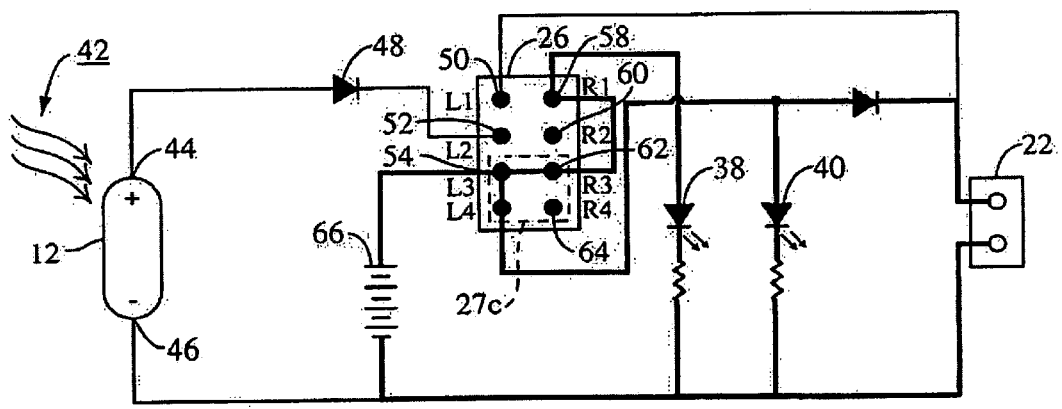

FIGS. 3A–3C are schematic circuit diagrams depicting circuit connections, i.e., electrical signal connecting circuitry, in the three switch selectable modes alluded to in the discussion of FIG. 2. In these FIGs, an elliptical symbol 12 is used to collectively indicate the two solar panels that will be described in more detail below, the operative circuits in the respective modes are signified by bold lines, and the switch contacts connected to the terminals L1–L4 ad R1–R4 are labeled 50–64. The switch and its inverted L-shaped contact bridging member 25 is denoted in each figure by dashed boxes labeled 27a–27c in the respective FIGS. 3A–3C. It will of course be understood that dashed boxes 27a, 27b and 27c respectively correspond to switch positions 32, 36 and 34 of FIG. 2.

Note that the energy developed by the solar cells of the component 12 is used in the switched modes of FIGS. 3A and 3B, but not in that of FIG. 3C wherein the internal battery 66 is used as the source of power communicated to receptacle 22 for use in charging or operationally powering a cell phone connected thereto.

The positive terminal 44 of solar panel component 12 is coupled through a first diode 48 to an external terminal L2 of the switch 26. An external terminal L1 is connected to one side of the jack or connector 22, and an external terminal R1 is connected to a circuit common node 49 and the negative terminal 46 of thesolar panel component 12 via a first LED 38 and it associated load resistor. Terminal R1 is also shorted to a terminal R3, with R2 and R4 being left open. Terminal L3 is connected to the positive terminal of an internal battery 66, the negative side of which is connected to common node 49. Terminal L4 is connected via a diode 39 to the top side of jack 22, and via a second LED 40 and its associated load resister to the common node 49.

In the first switch position 32 (FIG. 2), as illustrated by the dashed box 27a in FIG. 3A, the L-shaped contacting element of the contact bridging armature electrically connects terminals L1, l2 and R1 in common so that solar energy received by the panel 12 (as suggested by the rays 42) and converted into electrical power having a positive polarity at a terminal 44 and a negative polarity at a terminal 46, is connected through a diode 48 and switch 26 to jack 22. This is to say that with the switch 26 in the first position 27a as described above, the converted solar power is sent to the output jack, connector or receptacle 22 to feed through an adapter cable 16 to a battery in a cellular phone or the like. In this switch position, the first LED 38 is connected across the jack 22 and is thus turned ON to confirm the connection.

When the contact bridging armature is placed in the mid-position 36, as described above with respect to FIG. 2 (and 27b as shown in FIG. 3B), L2 is connected to R2 and L4. In this position, no LED is turned on because the contact bridging member does not contact R1, R3 or L4, their terminals leading to the LEDs. In this position, solar panel 12 is connected directly across the internal battery 66 and, as a result, the solar power flows into and charges the batteries if they are rechargeable.

When the contact bridging armature is moved to the position 34 (FIG. 2), as described above, and as indicated in FIG. 3C by the dashed box 27c, the terminals L3 and L4 are connected to terminal R3. With the switch in this configuration, battery 66 is connected directly across the jack 22 as well as both LEDs 38 and 40. Accordingly both LEDs are lit to indicate that a phone connected to jack 22 is being powered, or is having its batteries charged, by the internal battery or batteries 66 of the component 14.

In the exemplary embodiment, four rechargeable AA, 1.5 volt batteries contained within the component 14 are coupled together in series to deliver as much as 6 volts in potential across the terminals of jack 22. Since most cellular phone are powered by 4.8 volts or 3.6 volts, or even as law as 2.4 volts, to charge the battery in the cellular phone through the set of batteries installed in the charger, the potential must be reduced to the appropriate potential before the device is connected to the battery in the cellular phone. This can be accomplished by a selection circuit (not shown) provided in the device 14, or by a suitable voltage dropping circuit included within one of the connectors associated with he adaptor cables 16.

One advantage of this configuration is that non-rechargeable batteries can be installed in the device and used to charge a cellular phone battery. For example, in case of emergency where no other chargers are available and where the environment has insufficient light to actuate the solar panel 12, non-rechargeable batteries may be used to power the cellular phone through this arrangement. Similarly by using one or more re-chargeable batteries in the device, and taking care to see that the batteries are periodically charged using the solar panels, one can always be assured of having battery backup power.

Figure 4A:
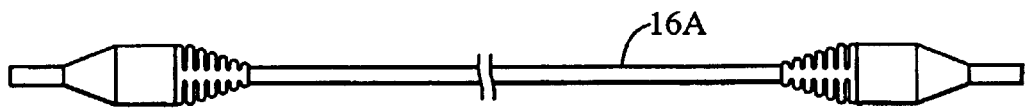
FIGS. 4A–4D are diagrams illustrating various types of adapter cables that may be used to interface the battery charging device of the present invention to common types of cellular phone devices.
Figure 4B:
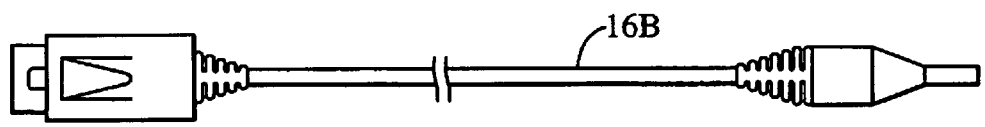
Figure 4C:
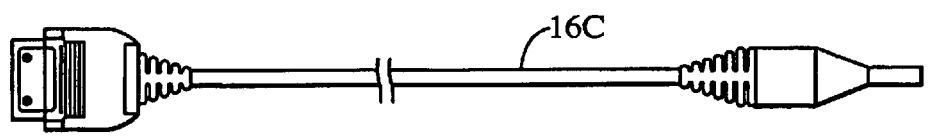
Figure 4D:

FIGS. 4A–4D are diagrams showing various configurations 16A–16D of adapter cables used to interface the battery charging device of the present invention to various types of cellular phones. FIG. 4A depicts an adapter cable for interfacing the battery charging device of the present invention to batteries in Nokia cellular phones. FIG. 4B depicts an adapter cable suitable for interfacing the charging device to batteries in cellular phone having a SIM interface. FIG. 4C illustrates an adapter cable for interfacing the device to batteries in Ericsson cellular phones.

Figure 5:
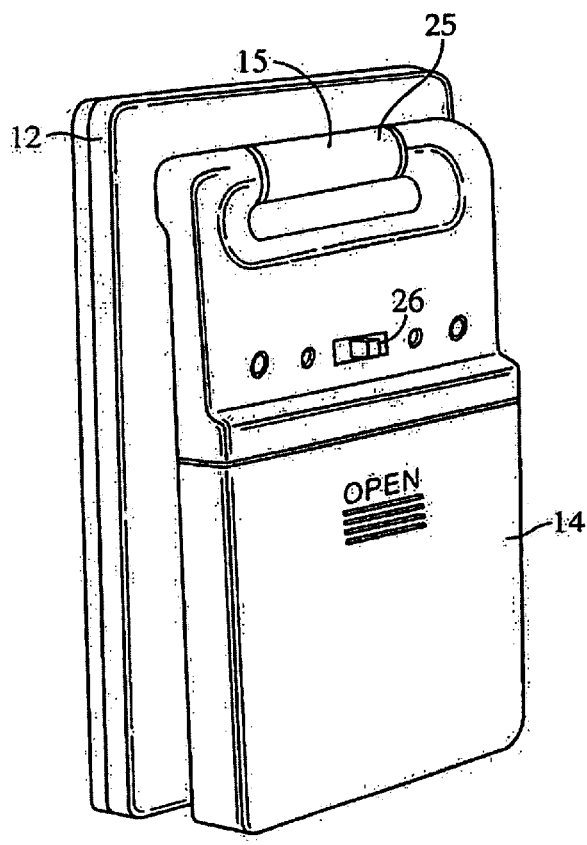
FIG. 5 is a frontal perspective view illustrating an embodiment of the present invention in its retracted configuration.
Figure 6:
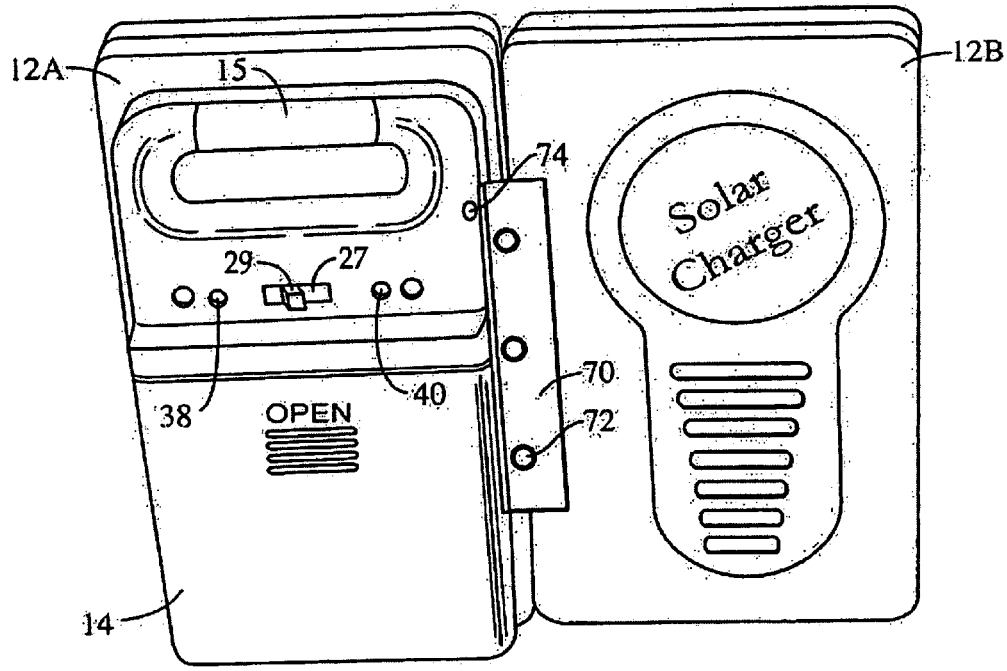
FIG. 6 is a perspective view illustrating the embodiment of FIG. 5 with one of its solar panels deployed.
Figure 7:
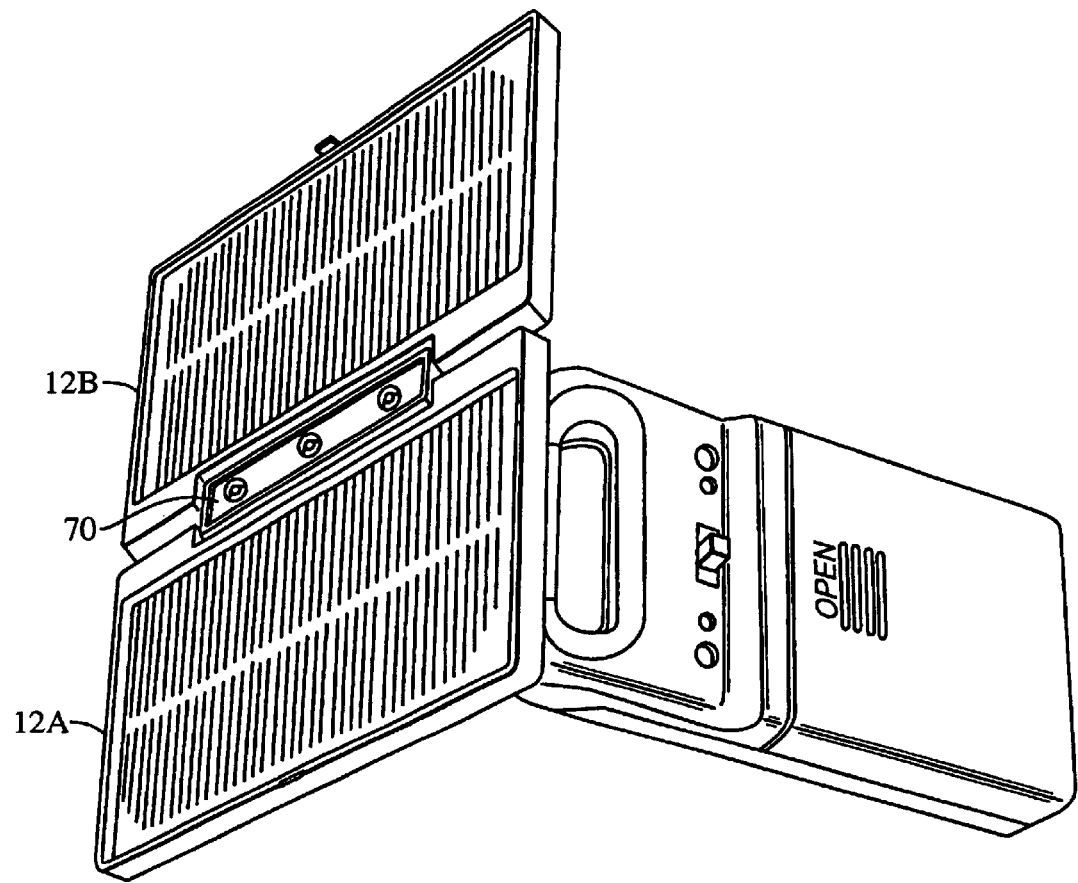
FIG. 7 is a perspective view illustrating the embodiment of FIG. 5 in its fully deployed configuration with its battery and switch containing component pivoted outwardly relative to the plane of the deployed solar panels.

Turning now to FIGS. 5–7, an actual embodiment of the present invention is illustrated and includes a two piece solar panel component 12 pivotally affixed to a battery and switch housing component 14 by a suitable hinge mechanism 15. As more clearly shown in FIG. 6, the housing of component 14 carries the switch 26 internally and includes a rectangular opening through which a manually engageable slider button or tab 29 affixed to the contact bridging member 27 extends. In addition, circular openings are provided through which the LEDs 38 and 40 are visible. Molded, embossed or otherwise applied above the LEDs and switch labels identifying the three switch positions/operational modes may be provided.

FIG. 6 also reveals the two part solar panel component and the hinge structure 70 used to hingedly attach the two panels 12A and 12B that make up the panel assembly. Although not shown in detail, the hinge structure 70 is comprised of elongated front and back plates that capture top and bottom pivot pins that are positioned within notched portions of the panels and extend towards each other. The plates are secured to each other by three bolts 72. The hinge structure thus allows the two panels to rotate between a retracted position, as shown in FIG. 5, aligned with and facing each other while lying in parallel adjacent planes, and a deployed position lying in side-by-side adjacent relationship and sharing a common plane, as depicted in FIG. 6.

FIG. 6 also shows the slideable cover labeled "OPEN" behind which four AA size re-chargeable batteries are to be contained. In addition, a small opening 74 is shown on the right side of housing 14. Beneath this opening is this jack 22 (FIGS. 3A–3C) for receiving the adapter cable used to connect the device to a cell phone or other electrically powered device.

FIG. 7 shows the device in its solar energy collecting configuration with the panels 12A and 12B in their deployed configuration, and also illustrates how the housing 14 can be rotated from a retracted configuration with one side thereof adjacent to and facing one of thee solar panels, as depicted in FIGS. 5 and 6, and a deployed or extended configuration rotated approximately 90 degrees outwardly relative to the panels to provide a means for supporting the panels so that they lie in a plane intersecting at about 45 degrees a surface upon which they are intended to rest. Note that in this disposition the solar energy responsive faces of the panels face generally upwardly and if faced in a southerly direction will gather maximum sunlight during the most of the day.

In the foregoing specification, the invention has been described with reference to a specific embodiment thereof. It will, however, be evident that various changes and substitutions of parts may be made thereto without departing from the broader spirit and scope of the invention. The specification and drawings are accordingly to be regarded in an illustrative rather than a restrictive sense.

Furthermore, although the present invention has been described in terms of an embodiment having particular design features, it is anticipated that other alterations and modifications may become apparent to those skilled in the art after having read the above disclosure. It is therefore intended that such disclosure be considered illustrative and not limiting, and that the appended claims be interpreted to include all such alterations, designs, modifications and embodiments as fall with the true spirit and scope of the invention.

What is claimed is:

1. A portable, cellular phone battery charger using solar energy as a primary source of power, comprising:
    a solar energy collecting component including at least two solar panels pivotally connected together and rotatable relative to each other between a retracted configuration and a deployed configuration;
    a housing that is pivotally connected to said solar energy collecting component;
    a battery charger component disposed in the housing-component including a rechargeable battery being electrically connectable to said solar panel, and an output jack being electrically connectable to said battery and said telephone to be recharged;
    a switching component disposed in the housing, the switching component comprising a multiple mode switch and associated electrical signal connecting circuitry, said switch and said circuitry being selectively operable between a first mode, a second mode, and a third mode,
    said first mode connecting said solar energy collecting component to said output jack for providing electrical power to said telephone connected thereto,
    said second mode connecting said solar energy collecting component to said rechargeable battery for providing recharging electrical power thereto, and
    said third mode connecting said rechargeable battery to said output jack for providing electrical power to said telephone connected thereto.

2. A portable, cellular phone battery charger using solar energy as a primary source of power as recited in claim 1 wherein said solar panels are generally planar and are pivotally connected together by a hinge assembly that allows the panels to be rotated relative to each other between a retracted configuration with said panels aligned with and facing each other while respectively lying in generally parallel adjacent planes, and a deployed configuration with said panels lying in side-by-side adjacent relationship and sharing a common plane.

3. A portable, cellular phone battery charger using solar energy as a primary source of power as recited in claim 2 wherein said housing is of generally rectangular configuration and has one side pivotably connected to a first one of said panels, said housing being rotatable relative to said first one of said panels between a retracted configuration with one side thereof adjacent to and facing said first one of said panels, and an extended configuration rotated outwardly relative to said first one of said panels to provide a means for supporting the panels in their deployed configuration so that they are caused to lie in a plane angularly intersecting a supporting surface.

4. A portable, cellular phone battery charger using solar energy as a primary source of power as recited in claim 3 wherein said electrical signal connecting circuitry includes indicator means for visually indicating the operative mode of said switch and circuitry.

5. A portable, cellular phone battery charger using solar energy as a primary source of power as recited in claim 4 wherein said indicator means includes at least one LED for indicating that a connected telephone is receiving power from said solar panels.

6. A portable, cellular phone battery charger using solar energy as a primary source of power as recited in claim 5 wherein said indicator means includes a second LED for indicating that a connected telephone is receiving power from said rechargeable battery.

7. A portable, cellular phone battery charger using solar energy as a primary source of power as recited in claim 1 wherein said solar panels are generally planar, of rectangular configuration, and one side of a first of said panels is hingedly connected to one side of a second of said panels such that said second panel can be rotated between a retracted configuration with said panels aligned with and facing each other, and a deployed configuration with said panels lying in side-by-side adjacent relationship and sharing a common plane.

8. A portable, cellular phone battery charger using solar energy as a primary source of power as recited in claim 7 wherein said housing is of rectangular configuration and has one side thereof hingedly attached to a second side of said first panel such that said housing can be rotated about its hinged connection between a retracted configuration with one side thereof facing said first panel and an extended configuration with one side thereof not facing said first panel.

9. The portable, cellular phone battery charger as recited in claim 2, wherein said first mode connects only said solar energy collecting component to the output jack.

10. The portable, cellular phone battery charger as recited in claim 2, wherein the second mode connects said solar energy collecting component only to said rechargeable battery.

11. The portable, cellular phone battery charger as recited in claim 2, wherein the third mode connects only said rechargeable battery to said output jack.

* * * * *